May 14, 1946.  R. NOSKE  2,400,252
OPTICAL SIGHTING INSTRUMENT
Filed July 17, 1943
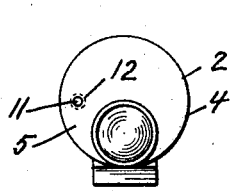
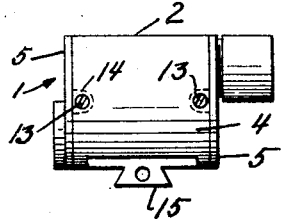
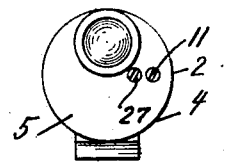
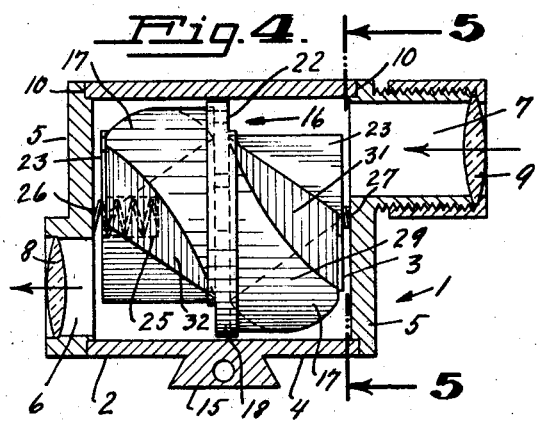
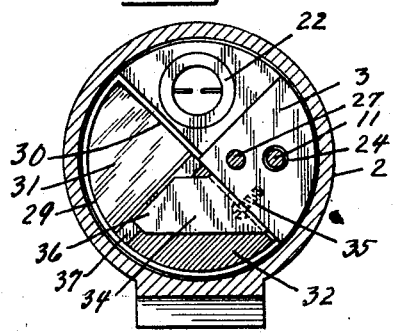
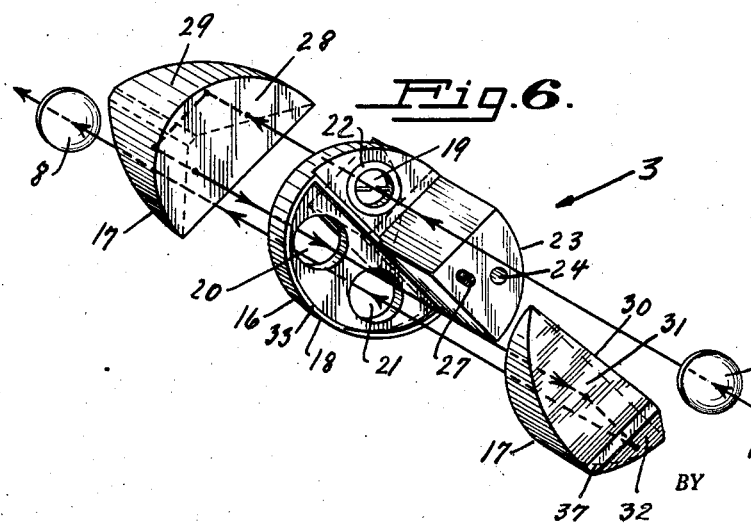
INVENTOR,
RUDOLF NOSKE.
BY
ATTORNEY Patented May 14, 1946

2,400,252

UNITED STATES PATENT OFFICE 2,400,252

OPTICAL SIGHTING INSTRUMENT

Rudolf Noske, San Carlos, Calif.

Application July 17, 1943, Serial No. 495,112

2 Claims. (Cl. 88—33)

The present invention relates to improvements in optical sighting instruments adapted for use in connection with rifles and other machines and articles of manufacture where telescopic sighting is desirable.

The principal object of my invention is to provide an optical sighting instrument of the character described that is simple in construction, inexpensive and extremely compact, the total length of the instrument when used for a rifle sight being in the neighborhood of one inch, although, of course, it may be built to different dimensions.

A further object of the invention is to utilize a compact prismatic system of the type described in my Patent No. 2,309,268, with various improvements incorporated therein.

A still further object of the invention is to provide a sighting instrument of the character described in which a pair of prisms are mounted on a frame so as to form a compact unit therewith and in which a reticule is mounted in the frame for sighting.

It is further proposed in the present invention to mount the prismatic unit in a suitable housing with freedom of longitudinal adjustment from the outside of the housing for bringing the reticule into focus.

And finally it is proposed to provide a sighting instrument of the character described which may be easily assembled and taken apart, and in which a single rod serves to hold the prismatic system against turning movement and to clamp the end walls of the housing upon the body thereof.

Further objects and advantages of my invention will appear as the specification proceeds, and the novel features of the same will be fully set forth in the claims hereto attached.

The preferred form of my invention is illustrated in the accompanying drawing, forming part of this application, in which:

Figure 1 shows an end view of my instrument;

Figure 2, a side view of the same;

Figure 3, an end view taken from the opposite end;

Figure 4, a longitudinal section through the instrument, showing the prismatic system in side elevation;

Figure 5, a cross-section taken along line 5—5 of Figure 4; and

Figure 6, an exploded perspective view of the prismatic unit illustrating the manner in which the parts thereof are fitted together.

While I have shown only the preferred form of my invention, I wish to have it understood that various changes or modifications may be made within the scope of the claims hereto attached without departing from the spirit of the invention.

In its preferred form my sighting instrument 1 comprises in its principal features a housing 2 and a prismatic system 3 accommodated therein.

The housing is here shown as consisting of a cylindrical body 4 and two end plates 5 provided with sight apertures 6 and 7 arranged in diametrically opposite positions, and having suitable lenses 8 and 9 mounted in the apertures.

The end walls have marginal recesses 10 fitting the edges of the cylindrical body and allowing a portion of the ends to slide into the body for insuring a firm fit.

The end walls are clamped upon the body portion by means of a single rod 11 passing through one of the end walls and threaded into the other end wall, as at 12. This rod also serves as a guide for the prismatic system and holds the latter against rotary movement, as will be explained hereinafter.

A pair of side screws 13 passing through the body of the housing into projecting ears 14 of the end plates additionally serve to properly position the end plates.

The housing is provided with a downwardly projecting, undercut bracket 15 by means of which it may be secured upon an object in any suitable manner well known in the art. Conventional means also may be used for effecting lateral and elevational adjustment of the housing with respect to the object supporting the same.

The prismatic system consists in its principal features of a frame 16 and the two prisms 17, which are combined to form a unitary prismatic reversing structure.

The frame comprises a disc 18 which may be considered as being divided into four quarters and which is provided with three sight apertures 19, 20 and 21 arranged centrally with respect to three of said quarters. The aperture 19 is provided with a reticule 22 which may consist of a ring having two bars extending diametrically toward the center so as to leave a slight central spacing between the same.

The fourth quarter on each side of the disc is occupied by a post 23 of symmetrical form, the two posts being alined and thus forming a quarter section of a cylinder. The length of this latter quarter section is slightly less than the longitudinal space in the housing, as clearly shown in Figure 4, so as to allow of a certain amount of adjustment in a longitudinal direction.

The outside diameter of the disc corresponds substantially with the inner diameter of the housing so as to have a sliding fit therewith, and the posts serve as an anchoring means for positioning the prismatic unit in the housing. For this purpose the posts are formed with a longitudinal hole 24 by means of which they may be made to slide on the rod 11 which thus holds the prismatic unit against turning movement.

One of the posts is recessed, as at 25, to receive a spring 26 bearing against one end of the housing, and directly opposite the spring a screw 27 is provided in the other end of the housing to bear against the outer face of the other post, so that the entire prismatic unit may be longitudinally adjusted in the housing by a loosening or tightening of the screw 27. It is obvious that the recess 25 may be provided in the end plate instead of in the post.

The two prisms 17 are similar in shape and construction, each being defined by a flat bottom face 28, a semi-cylindrical outer face 29, a flat diametrical face 30, and the two angular reflecting faces 31 and 32. They are fitted on opposite sides of the disc in semi-overlapping relation, the frame disc being equipped with marginal flanges 33 for seating each prism, with one-half of its inner face contacting the corresponding post.

To hold each prism against endwise movement, I provide a bracket 34 having one flange secured to one of the posts by means of a screw 35, and having its other end projecting over the intersection between the reflecting faces 31—32, as at 36, the prism being slightly flattened at the intersection, as at 37.

The frame 16, with its posts 23 and marginal flanges 33 is preferably made in one piece, and may be made of metal or plastic as desired, or any other suitable material.

The two prisms may be easily slipped into their respective places within the flanges 18 and up against the posts, and the brackets 34 may be readily secured for holding the prisms against endwise movement by insertion of the screws 35.

The reticule 22 is preferably permanently fixed in place within the aperture 19, so that the entire prism assembly forms a rigid and compact unit adapted for insertion into the housing.

For assembling my sighting instrument, one of the end walls is first fixed in place by means of the screw 13. The rod 11 is next inserted, with its head bearing on the outer face of the end plate. The spring 25 is seated in one end of the prism unit post, and this end is passed into the housing from the open end of the latter, the hole 24 engaging over the rod. Next the other end plate is moved into place so as to register with the first end plate, and the extreme end of the rod 11 is screwed into place in the second plate, as at 12. Insertion of the screws 13 and of the screw 27 completes the assembly, and the prism unit may be adjusted longitudinally by operation of the latter screw.

The entire unit, when used as a gun sight, need not be much over an inch in length, and may be readily substituted for the conventional rear sight in common use, and may be adjusted laterally and as to elevation by conventional means, not shown.

The reticule may be brought into focus by operation of the screw 27 which is operable from the outside of the housing.

I claim:

1. An optical sighting instrument comprising a housing having opposing end walls and sight apertures in the latter, a unitary prismatic reversing unit in the housing, a rod extending longitudinally through the housing and having the unit slidable thereon for positioning the unit with respect to the sight apertures, and means for longitudinally adjusting the unit, the adjusting means comprising a spring interposed between the unit and one end wall of the housing, and a screw threaded into the other end wall and bearing on the opposite end of the unit.

2. An optical sighting instrument comprising a housing having opposing end walls and sight apertures in the latter, a unitary prismatic reversing unit in the housing and having a reticle fixed therein, a rod extending longitudinally through the housing and having the unit slidable thereon for positioning the unit with respect to the sight aperture, and means for longitudinally adjusting the unit, the adjusting means comprising a spring interposed between the unit and one end wall of the housing, and a screw threaded into the other end wall and bearing on the opposite end of the unit.

RUDOLF NOSKE.